Feb. 12, 1935.  S. O. WHITE ET AL  1,990,850
AUTOMOBILE TRANSMISSION
Original Filed Aug. 11, 1930
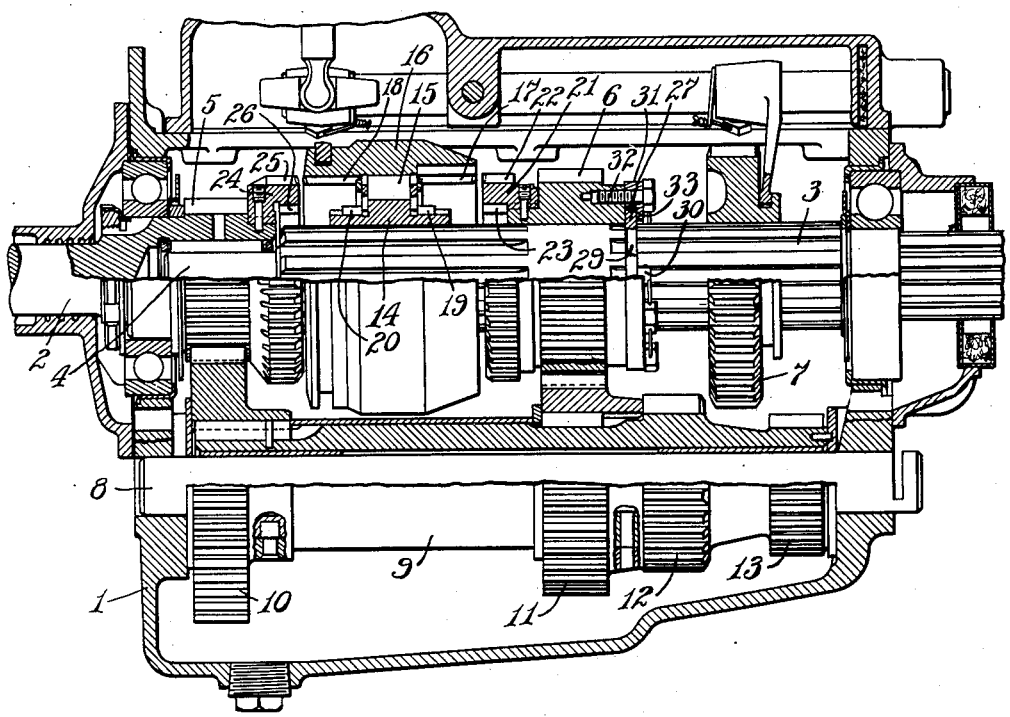
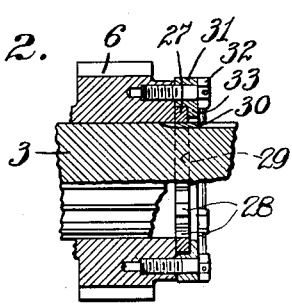
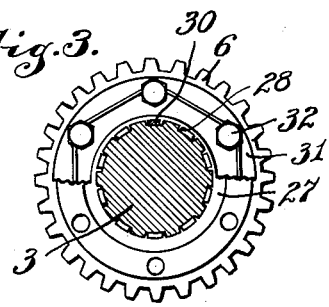
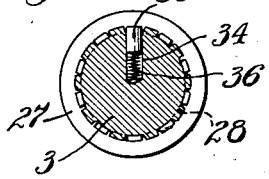
Inventors
Samuel O. White and
Otto E. Fishburn,
By Hood + Hahn
Attorneys Patented Feb. 12, 1935

1,990,850

UNITED STATES PATENT OFFICE 1,990,850

AUTOMOBILE TRANSMISSION

Samuel O. White and Otto E. Fishburn, Muncie, Ind., assignors, by mesne assignments, to Free Wheeling Patents Corporation, South Bend, Ind., a corporation of Delaware Original application August 11, 1930, Serial No. 474,366. Divided and this application March 28, 1931, Serial No. 525,933

1 Claim. (Cl. 308—135)

Our invention relates to improvements in gears primarily adapted for automobile transmissions. One of the objects of the invention is the provision of means for locking a transmission gear against axial displacement while permitting the same to be freely rotated on its shaft. While the invention is advantageously applicable to automobile transmissions and particularly to the type of transmissions with which it is illustrated as being used, it will be understood that our invention is more comprehensive in scope than the specific application illustrated and described.

The present application is a division of our co-pending application, Serial Number 474,366, filed August 11, 1930, for Automobile transmission.

For the purpose of disclosing the invention we have illustrated an embodiment thereof in the accompanying drawing, in which:

Fig. 1 is a longitudinal sectional view of a transmission embodying our invention;

Fig. 2 is an enlarged detail section showing more particularly the gear locking means;

Fig. 3 is an end view, partially broken away, of the structure illustrated in Fig. 2, and Fig. 4 is a view of a modification of the invention.

In the structure showing the application of the invention to an automobile transmission we have illustrated a transmission of the type which is commercially known as free wheeling and in the structure illustrated there is provided a transmission casing 1 having extending thereinto a driving shaft 2 and a driven shaft 3, the free end of the driven shaft being piloted as at 4 in a recess in the end of the driving shaft 2. The driving shaft 2 is provided with a fixed gear 5 thereon and the driven shaft 3 is provided with a rotatable axially fixed gear 6, as well as a rotatably fixed axially shiftable gear 7.

Beneath the aligned shafts 2 and 3 there is provided a shaft 8 having rotatably mounted thereon a spindle 9 provided with a gear 10 meshing with the gear 5. A second gear 11 on the spindle 9 meshes with the gear 6. A third gear 12 on the spindle is adapted to be meshed with the gear 7, which gear 7 also is adapted to be meshed with an idler (not shown) meshing with a gear 13 for reverse drive. The drive of the shaft 3 through gears 11 and 6 constitutes a second speed drive, first speed drive being through gears 12 and 7 and, high speed drive being accomplished by directly connecting the shafts 2 and 3 in a manner more fully hereinafter described.

Rotatably fixed and axially shiftable on the driven shaft 3 is an overrunning clutch mechanism through which the shaft 3 may be driven. This mechanism comprises an inner member 14 having suitable cammed surfaces on its periphery, on which are adapted to ride a series of rollers 15 adapted to cooperate with an outer member 16, as more fully described in the heretofore identified co-pending application. The outer member 16 is provided on opposite sides of the roller clutch portion with dental teeth 17 and 18 and the inner member 14 is provided with dental clutch teeth 19 and 20. The gear 6 is provided with an extension 21 having outer peripheral dental teeth 22 adapted to mesh with the teeth 17 and inner peripheral teeth 23 adapted to be meshed with the teeth 19.

The end of the driving shaft 2 is provided with a hub member 24 provided with outer dental teeth 25 and inner dental teeth 26 respectively adapted to mesh or engage the teeth 18 and 20. It will be noted that the teeth 20 and 19 do not extend laterally as far as the teeth 17 and 18 so that these teeth may engage with the respective teeth 22 and 25 prior to the engagement of the teeth 19 and 20 with the teeth 23 and 26.

By the above construction, when the overrunning clutch structure is shifted to the right looking at Fig. 1 thereby engaging teeth 17 and 22, the shaft 3 will be driven from the shaft 2 in second speed through the overrunning clutch, the arrangement of the clutch being such that in event the speed of the shaft 3 becomes greater, through the momentum of the car, than the speed of the shaft 2, the two shafts will rotate independently. When, however, the shaft 2 becomes the driving shaft, the two shafts will be connected. A further shift to the right, looking at Fig. 1, engages teeth 19 and 23 thereby "locking out" the overrunning clutch so that, the shafts 2 and 3 will be connected, in second speed, irrespective of the relative direction of rotation of the shafts.

If the overrunning clutch mechanism be shifted to the left, looking at Fig. 1, to engage teeth 18 and 25 the shafts will be driven at high speed or direct, through the overrunning clutch while a continued shift to the left to engage teeth 20 and 26 will "lock out" the overrunning clutch for high or direct drive.

It will be noted that while the gear 6 is rotatably mounted on the shaft 3 it must be held against axial displacement and against axial displacement in two directions. To this end a shoulder member 27 is fixed on the shaft. This member preferably comprises a ring toothed as at 28 on its inner circumference to correspond to the splines on the shaft 3 whereby the ring may be slid in position. At the point where it is desired that the ring be fixed, the shaft 3 is provided with an annular groove 29 having a depth equal or greater than the height of the splines and adapted to accommodate the ring. When the teeth 28 on the ring take into the groove 29, the ring is given a sufficient turn to bring the teeth 28 opposite the splines, thereby locking the ring against axial displacement and the ring may be held against rotative movement by a locking key 30 driven in the splines and between the teeth of the ring. This ring thus forms a shoulder or abutment member. An annular ring 31 is secured on one face of the hub of the gear 6 by means of cap screws 32 and this ring is provided with a groove to form a shoulder 33 overhanging the groove or stop or abutment 27 whereby the gear 6 is locked against axial movement in either direction.

In Fig. 4 I have illustrated a modified means for holding the ring against rotative movement after it has been given the correct turn in the groove 29. In this structure the shaft is provided with a radial opening 34 adapted to receive a pin 35 biased outwardly by a coiled spring 36 seated in the base of the opening 34. When the ring 27 is slipped into position the pin 35 may be depressed until the ring has been turned to bring the teeth 28 opposite the splines. This pin may then be released and will project between two of the teeth 28 locking the ring against rotation.

We claim the following:

In a transmission, the combination with a splined shaft having an unsplined portion intermediate of its ends, of a gear rotatably mounted on said unsplined portion, shiftable elements mounted on the splined portions of said shaft, the splines of said shaft having transversely extending slots therein, a thrust ring having splines formed in the inner periphery thereof coinciding with the splined grooves of the shaft, said ring being rotatable in said slots about the shaft to bring the splines of the ring opposite the splines of the shaft to hold said ring against axial displacement in either direction, a detent in the shaft engageable between the splines of the ring for locking said ring against rotation on the shaft, an annular member mounted on said gear and having a spaced apart portion equal to the width of the ring to receive the same between said member and gear to prevent axial displacement of the gear in either direction.

SAMUEL O. WHITE.
OTTO E. FISHBURN.